United States Patent [19]
Hoffmann

[11] 4,304,443
[45] Dec. 8, 1981

[54] LINEAR MOTION BALL BEARING

[75] Inventor: Alfred Hoffmann, Bilthoven, Netherlands

[73] Assignee: SKF Industrial Trading & Development Co. B.V., Nieuwegein, Netherlands

[21] Appl. No.: 110,447

[22] Filed: Jan. 8, 1980

[30] Foreign Application Priority Data

Jan. 15, 1979 [NL] Netherlands ................ 7900300

[51] Int. Cl.³ .................................. F16C 29/06
[52] U.S. Cl. ......................... 308/6 C; 308/6 R
[58] Field of Search ............ 308/6 C, 6 R; 6 B, 6 A, 308/3 A, 3 R, 3.8

[56] References Cited

U.S. PATENT DOCUMENTS

| | | |
|---|---|---|
| 3,353,875 | 11/1967 | Karge ............................ 308/6 R |
| 4,030,191 | 6/1977 | Ernst et al. ..................... 308/6 C |
| 4,040,679 | 8/1977 | Teramachi ....................... 308/6 C |

*Primary Examiner*—Lenard A. Footland
*Attorney, Agent, or Firm*—Daniel M. Rosen; J. David Dainow

[57] ABSTRACT

A ball bearing wherein each holder has only one oval-shaped race and a plate-like bearing surface member formed as a gutter-like circulating bearing surface conforming to the oval shape with four ball holders situated in the housing such that the bearing surface members run obliquely outward toward one another so that the straight race sections for the balls absorbing the load at one edge and the other straight race sections at the other edge run essentially along the ribs of two rectangular parallelpipeds having different cross-sectional dimensions.

19 Claims, 4 Drawing Figures

U.S. Patent     Dec. 8, 1981     4,304,443
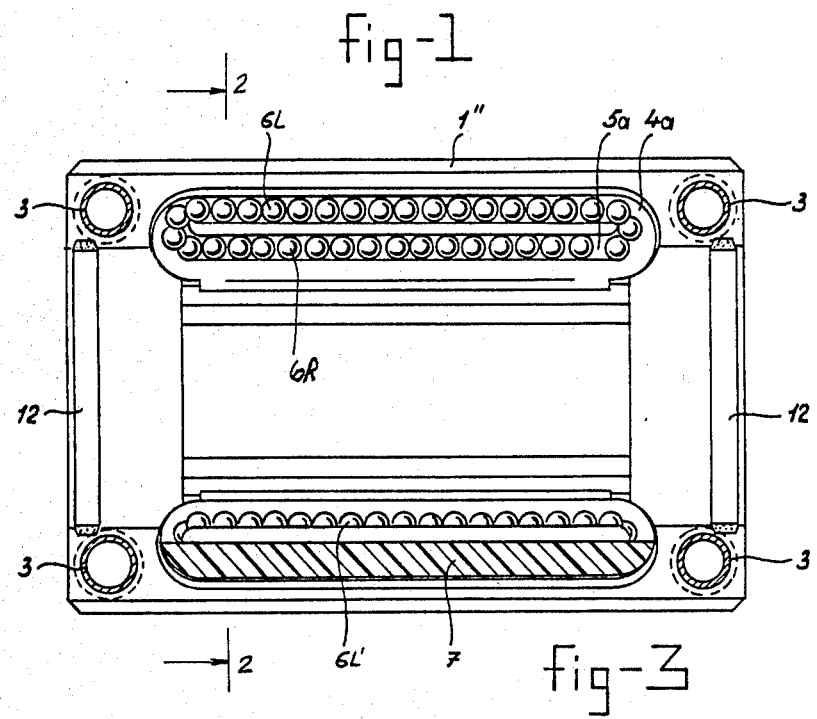
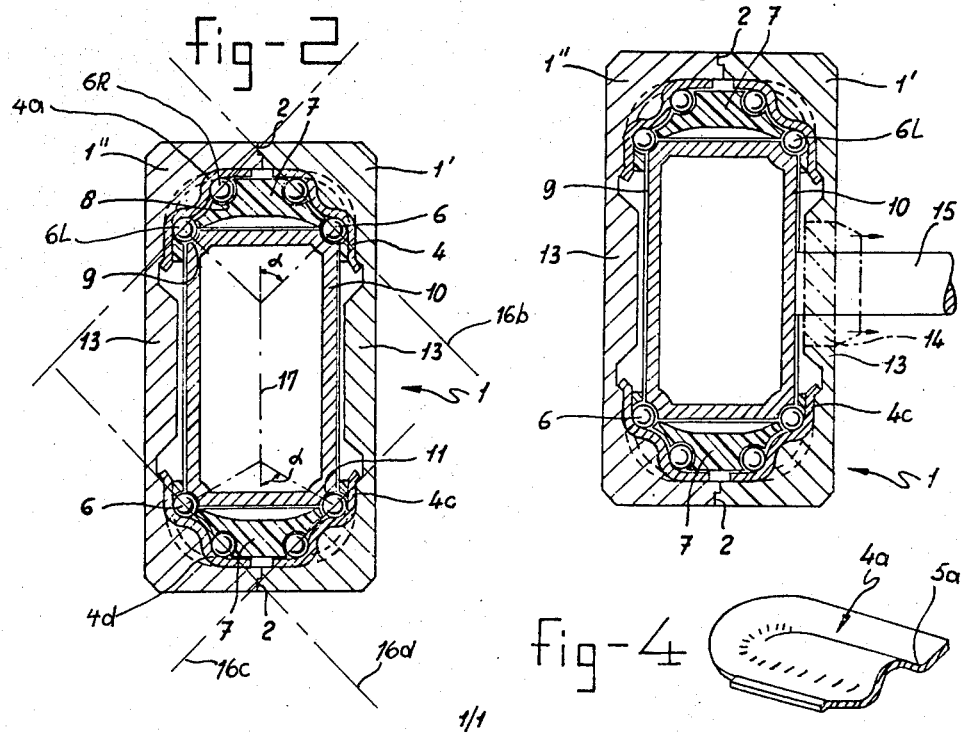

LINEAR MOTION BALL BEARING

BACKGROUND OF THE INVENTION

The invention concerns linear motion a ball bearing, comprising a housing with a generally rectangular passage for a shaft-like element having a generally rectangular cross-section. In the housing are situated at least four ball holders, each of which consists of a plate-like bearing-surface member and a cage member arranged thereon, which between them form at least one oval-shaped race for a circulating row of balls. Each raceway consists of two straight sections running parallel to one another and two curved sections connecting the ends of these straight sections. The cage member has a slot-like opening such that the balls travelling in at least one of the straight sections of the race project partially through this opening in order to come into contact with the shaft-like element, these balls being load bearing. A ball bearing of this type is known from U.S. Pat. No. 3,353,875.

In the known ball bearing each ball holder consists of a rectangular plate forming the bearing-surface member, in which is formed a longitudinal recess running through the center and, at the transverse ends of the plate, transverse recesses. In addition, on the raised sections of the plate on either side of the longitudinal recess are placed straight strips with rounded ends; these ends form the center side boundaries of the two straight race sections and the two curved sections of the two oval-shaped races formed at each plate for two circulating rows of balls. The cage member consists of a cover plate having essentially the same dimensions as the bearing-surface plate. In the surface plate are arranged two oval openings running parallel to one another at a distance apart, the boundary surfaces of which form the outer boundaries of the straight race sections and the curved sections. These side surfaces have a shape such that the circumference of the opening at the upper edge of the cage member is smaller than at the lower edge, so that the balls project slightly beyond the upper surface of this member. Four of these ball holders lie arranged loosely in a rectangle in the housing and are pressed by means of set screws against the shaft-like element. Only the rows of balls which roll over the raised sections of the bearing-surface plate are in contact with the straight side edges of the rectangular shaft.

The disadvantage of this known ball bearing is that the balls of each circulating row, on passage to the raised sections of the bearing-surface plate, must, as it were, go over a threshold, resulting in shocks. Moreover, each ball holder must have two rows of balls circulating along an oval race, while the housing and these ball holders are supplied as loose components.

The object of the invention is to provide a ball bearing of the type mentioned which does not have these disadvantages.

SUMMARY OF THE INVENTION

This object is achieved in the ball bearing according to the invention in that each ball holder has only one oval-shaped raceway and in the plate-like bearing-surface member of each ball holder is formed a groove or channel shaped circulating bearing-surface, of essentially like depth, conforming to this oval shape. The four ball holders are situated in the housing such that the bearing-surface members are positioned obliquely toward one another, so that the straight race sections for the load bearing balls at one edge and the other straight race sections at the other edge run essentially along the ribs of two rectangular parallelepipeds having unlike cross-sectional dimensions. More particularly, the straight sections for the load bearing balls of two adjacent ball holders overlie two adjacent edges of the shaft thereby generally defining a parallelogram, the straight section of these ball holders for unloaded balls defining a second parallelogram of different cross-section from the first. In this way a uniform bearing surface is obtained for the balls, which are thus able to circulate without shocks, while it is sufficient to have only four circulating rows of balls.

The oval channel bearing surface is preferably formed by a deformation of the plate member. In the cage member is formed an oval groove which with the channel bearing surface in the plate member forms the oval race. The slot-like opening is formed in the groove which lies facing the straight section of the bearing surface for the load bearing balls.

In addition, the housing may consist of two sections to be joined and the plate members may be fixed secured in the housing sections, for example by pressing. In this way the housing and the ball holders arranged therein form a sub-assembly that may be delivered as one component.

In addition, the cage member may advantageously be made of a resilient material, for example a plastic, and a common cage member may be present for two adjacent ball holders.

The sections of the housing are preferably connected together by means of hollow rivets. A screw for example may then be screwed into the hollow of the rivets for attaching the housing or for attaching a component to the housing.

Formed in the shaft element are races which are capable of engaging and guiding the load bearing balls. In addition, these races are formed in the corners of the reactangular shaft element, so that the line or planes through the midpoints of the load-bearing balls and perpendicular to the lines of contact with the shaft element run obliquely inward toward one another. The shaft element may advantageously be hollow.

The angle of contact, i.e., the angle which, seen in cross-section at each ball holder, makes a line through the midpoint of a load-bearing ball and perpendicular to the line of contact of the accessory bearing surface, with the ascending axis of symmetry of the rectangular shaft-like element, is preferably in the range of 45°–60°.

It is noted that in the German Design Pat. No. 7508272, is disclosed a linear motion ball bearing wherein only four balls circulating along an oval race are present and bearing surfaces are formed in the shaft element, while the housing consists of two sections to be joined. In this case, however, no separate ball holders are present, since bearing surfaces for the balls are formed in the inner edge of the housing itself, which balls are restrained by cage members, it being necessary at the same time for the shaft element to have a double T-shaped profile in cross-section. In this ball bearing, moreover, the lines run obliquely outward toward one another through the midpoints of the load-bearing balls and perpendicular to the lines of contact with the shaft-like element.

The invention will now be described in greater detail by means of the example illustrated in the drawing.

DESCRIPTION OF THE DRAWINGS AND THE PREFERRED EMBODIMENT

FIG. 1 shows a sectional view of the housing of a ball bearing according to the invention.

FIG. 2 is a cross-section through the housing of the ball bearing with a shaft element situated therein, FIG. 3 is a cross-section similar to FIG. 2, of another embodiment where the housing is provided with a removable wall section, and FIG. 4 shows a section through a bearing-surface member.

As shown in the drawing, the linear motion ball bearing according to the invention comprises a housing 1 which consists of two sections 1' and 1" to be joined. At 2 is formed a centering shoulder. The housing sections 1' and 1" are joined to one another by means of the hollow rivets 3. The housing may be made of any material, such as steel, aluminum, a plastic, or a material obtained by powder metallurgy, since no bearing surfaces are formed in the housing itself.

The bearing surfaces of the ball holders are formed in the plate-like members 4a, 4b, 4c and 4d, which are shaped such that oval-shaped circulating channel bearing surfaces 5a–5d respective are formed. The members 4a–4d are fixedly secured in the housing, for example by pressing.

In the typical channel bearing surface 5a of each typical plate member 4a lie balls 6, (balls 6L being load-bearing and balls 6R being return balls) which are restrained by the cage members 7. In the drawing are shown two cage members 7, although each cage member 7 may alternatively consist of two separate parts. In the cage members 7 are formed circulating grooves 8, while in one of the straight sections of the groove 8 is arranged a slot-like opening 9, so that the row of balls which are covered by the straight section of the groove 8 project inward from the cage member 7 in order to be able to come into contact with the shaft element 10 running through the passage in the housing 1, as well as with the bearing surfaces or parallel edge areas 11 formed in the corners of the element 10. As shown in FIG. 2, the angles of contact $\alpha$ and $\alpha'$, may be in the range of 45°–60°.

Also situated in the housing are the sealing means, for example rings. The housing is stiffened by the thickened wall sections 13.

As shown in FIG. 3, a wall of the housing 1 may be provided by a removable section 14; when this section is removed a uniform opening is provided through which may project a supporting or fastening member 15, which member is attached to the shaft element 10. In this way the shaft element 10 may be secured while the housing 1 is movable, which in particular is advantageous for the execution of a wall design. Moreover, the shaft element is thereby reinforced, for example against bending.

Alternatively, the housing 1 may be provided with means of attachment by which is may be attached to a support, while the shaft element 10 is movable. Components in FIG. 3 the same as those of FIG. 2 are deemed to have the same reference numerals.

As indicated earlier each oval raceway is formed by one of the plate members 4a–4d, shown more specifically in FIG. 2. The raceways in typical plate member 4c and 4d define typical raceway planes 16c and 16d respectively. Each of these planes is oblique relative to a central plane 17 through the shaft 10. The actual orientation of typical raceway plane 16b is established by an angle $\alpha$ between plane 16b and central plane 17; similarly plane 16c is oblique to central plane 17 by angle $\alpha'$. Plate member 4a for example defines therein parallel straight race sections, one for load-bearing balls indicated by 6L and the other for unloaded return balls indicated by 6R. Adjacent thereto is plate 4b with its corresponding straight race sections for loaded and unloaded return balls, 6L' and 6R' respectively. As raceway planes 4a and 4b are oblique to central plane 17, race sections 6L with 6L' represent sides of a first parallelogram while sections 6R and 6R' represent sides of a second parallogram of different width between its sides.

I claim:

1. In a linear motion ball bearing including a housing with a passage for a shaft having a generally rectangular cross-section having four parallel edges, in which housing are situated at least four ball holders, each of which consists of a plate-like member and a cage member arranged thereon, which between them form at least one oval-shaped raceway for a circulating row of balls, which raceway consists of two straight sections running parallel to one another and two curved sections connecting the ends of these straight sections, and the cage member has a slot-like opening such that the load-bearing balls travelling in at least one of the straight sections of the raceway project partially through this opening in order to come into contact with the shaft, the improvement wherein each plate-like member of each ball holder defines therein a channel-shaped circulating bearing surface, the four ball holders being situated in the housing such that the bearing surfaces run obliquely outward toward one another, so that the straight race sections for load-bearing balls at two adjacent edges of said shaft and the corresponding straight race sections for unloaded balls extend essentially along the ribs of two rectangular parllelepipeds having unlike cross-sectional dimensions.

2. A ball bearing according to claim 1, wherein the oval channel bearing surface is formed by a deformation of the plate-like member, while in the cage member is formed an oval groove which with the channel bearing surface in the plate member forms the oval race, the slot-like opening being formed in the groove which lies facing the straight section of the bearing surface for the load-bearing balls.

3. A ball bearing according to claim 2, wherein the housing consists of two sections to be joined, and the plate-like members are arranged fixedly in the housing sections.

4. A ball bearing according to claim 3 wherein the housing sections are joined to one another by means of hollow rivets.

5. A ball bearing according to claim 2 wherein the cage member is made of a resilient material.

6. A ball bearing according to claim 5 wherein said cage member comprises two parts for two adjacent ball holders.

7. A ball bearing according to claim 1 wherein the shaft element has defined therein races which are capable of engaging and guiding said load-bearing balls.

8. A ball bearing according to claim 7, wherein the races are formed along the longitudinal edges of the shaft having a rectangular cross-section, where for two adjacent ball holders the lines through the mid-points of the load-bearing balls and perpendicular to the lines of contact of said balls with the shaft run obliquely inward toward one another.

9. A ball bearing according to claim 7, wherein the shaft is hollow.

10. A ball bearing according to claim 7, wherein the line through the mid-point of a load-bearing ball and perpendicular to the line of contact with the accessory bearing surface, makes an angle of contact with the ascending axis of symmetry of the rectangular shaft which is 45°–60°.

11. A ball bearing according to claim 1, wherein said housing comprises a side wall which defines therein a slot-like opening.

12. A ball bearing according to claim 11, comprising a removable section of the side wall for closing said opening in said side wall.

13. In a linear motion ball bearing including a central shaft of generally rectangular cross-section, a housing at least partially surrounding said shaft, a plurality of endless raceways for balls formed between said shaft and said housing, and cage means for guiding the balls in each raceway, the improvement wherein (a) said shaft has two pairs of opposite walls whose intersections define parallel longitudinal edge areas, each defining a straight bearing surface operable as an inner race for loaded balls of one raceway, (b) said bearing further comprising a plate-like ball holder situated intermediate said housing and each of said inner races, each ball holder having formed therein a generally oval channel comprising two parallel straight sections and two curved sections connecting the ends of said straight sections, one of said straight sections operable as an outer race bearing surface adjacent and co-operating with each of said inner races, the other straight section of each channel being a return race for unloaded balls, (c) said oval channel in each of said ball holders defining a raceway plane which is oriented askew to said shaft walls, whereby the loaded races of two adjacent ball holders define sides of a first parallelogram, and the return races of said adjacent ball holders define sides of a second parallelogram, having width different from that of the first parallelogram.

14. A bearing according to claim 13 wherein said cage means includes an oval channel of straight and curved sections corresponding to and cooperating with the oval channel in each ball holder for defining said raceways, said cage means further including a slot-like opening along one of its straight sections overlying an inner race, whereby balls can extend through said slot and bearingly engage said inner race of the shaft and said outer race of the ball holder.

15. A bearing according to claim 14 wherein said cage means comprises a pair of opposite parts, each having two adjacent channels for guiding balls in two adjacent raceways.

16. A bearing according to claim 13 wherein said shaft is hollow.

17. A bearing according to claim 13 wherein planes through mid-points of load-bearing balls in adjacent inner races and perpendicular to lines of contact of said balls with said inner races, extend obliquely toward each other.

18. A bearing according to claim 17 wherein said shaft has a central plane of symmetry separating said raceways into two opposite pairs of adjacent raceways, and said planes through said mid-points of said load-bearing balls each define an angle with said central plane of symmetry in the range of 45°–60°.

19. In a linear motion ball bearing including a central shaft, a housing at least partially surrounding said shaft, a plurality of endless raceways for balls formed between said shaft and said housing, and cage means for guiding the balls in each raceway, the improvement wherein (a) said shaft defines thereon parallel longitudinal edge areas, each defining a straight bearing surface operable as an inner race for loaded balls of one raceway, (b) said bearing further comprising a plate-like ball holder situated intermediate said housing and each of said inner races, each ball holder having formed therein a generally oval channel comprising two parallel straight sections and two curved sections connecting the ends of said straight sections, one of said straight sections operable as an outer race bearing surface adjacent and co-operating with each of said inner races, the other straight section of each channel being a return race for unloaded balls, (c) said oval channel in each of said ball holders defining a raceway plane which is oriented generally perpendicular to a plane through the mid-points of load-bearing balls and through the line of contact of said balls with said inner race.

* * * * *

UNITED STATES PATENT AND TRADEMARK OFFICE
CERTIFICATE OF CORRECTION

PATENT NO. : 4,304,443
DATED : December 8, 1981
INVENTOR(S) : Alfred Hoffmann

It is certified that error appears in the above—identified patent and that said Letters Patent is hereby corrected as shown below:

Col. 1, line 12, delete "race" and insert -- raceway --.

Col. 3, line 58, the line which reads "Alternatively, the housing" is a continuation of the preceding paragraph.

Col. 3, line 59, delete "is" and insert -- it --.

Signed and Sealed this

Second Day of August 1983

[SEAL]

Attest:

GERALD J. MOSSINGHOFF

Attesting Officer     Commissioner of Patents and Trademarks